Figure 6:
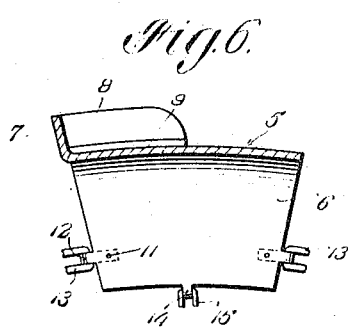

J. CLATT.
TIRE ARMOR.
APPLICATION FILED JUNE 3, 1914.
1,133,099.
Patented Mar. 23, 1915.
2 SHEETS—SHEET 1.
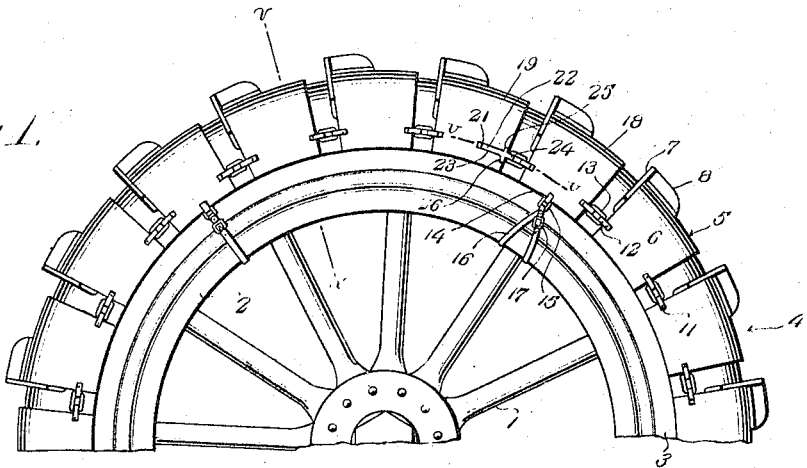
Fig. 1.
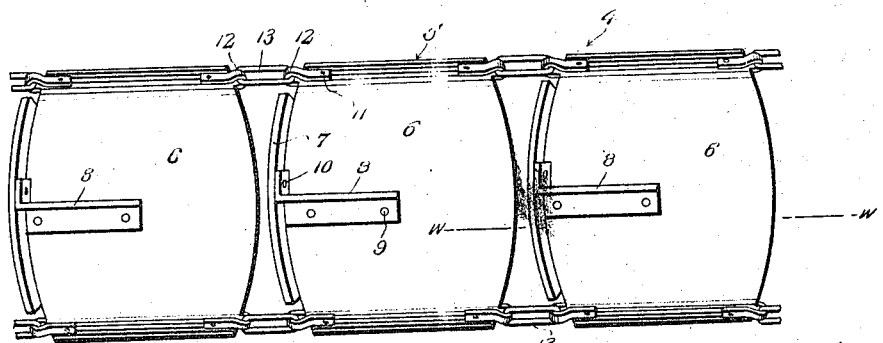
Fig. 2.  Fig. 5.
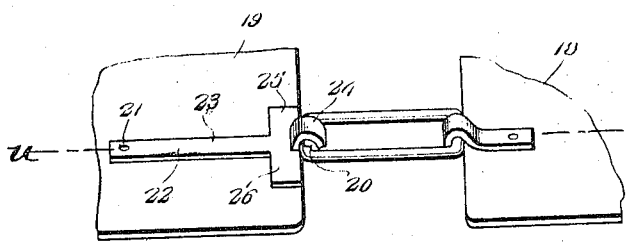
Fig. 3.
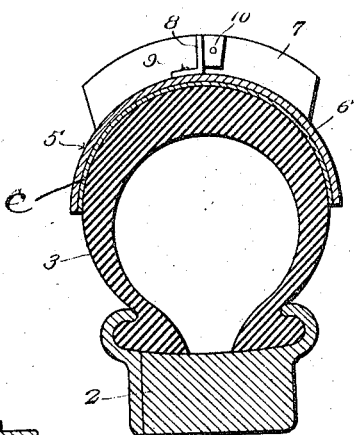
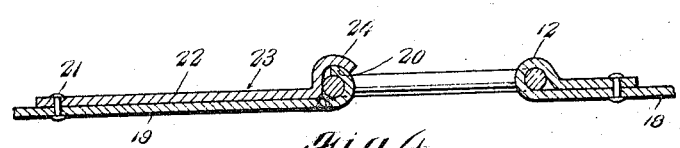
Fig. 4.
Witnesses
Inventor
John Clatt,
By Victor J. Evans
Attorney

J. CLATT.
TIRE ARMOR.
APPLICATION FILED JUNE 3, 1914.

1,133,099.

Patented Mar. 23, 1915.
2 SHEETS—SHEET 2.

Witnesses
J. H. Crawford
N. C. Foley

Inventor
John Clatt,
By Victor J. Evans
Attorney

UNITED STATES PATENT OFFICE.

JOHN CLATT, OF GORIN, MISSOURI.

TIRE-ARMOR.

1,133,099. Specification of Letters Patent. Patented Mar. 23, 1915.

Application filed June 3, 1914. Serial No. 842,751.

*To all whom it may concern:*

Be it known that I, JOHN CLATT, a citizen of the United States, residing at Gorin, in the county of Scotland and State of Missouri, have invented new and useful Improvements in Tire-Armor, of which the following is a specification.

The present invention relates to a tire armor, the primary object being to provide a tire of a self-propelling machine with means which will insure its travel over rough or sandy roads, through ruts formed in the road, as well as to insure the machine against skidding when traveling upon a wet or slippery surface, and which is further adapted to protect the tires to preserve the life of the same.

Another object of the invention is to provide an armor for pneumatic tires which may be easily and quickly applied and which, when in such applied position, will be sustained securely upon the tire.

A further object of the invention is to provide a tire armor made up of a plurality of plates conforming in shape to the portion of the tire with which they engage, the said plates being flexibly connected and certain of the same being provided with means which engage with the felly of the wheel and sustain all of the plates securely upon the tire.

A still further object of the invention is the construction of a tire armor formed of a plurality of connected plates, each of the said plates having one of its edges bent to form a lip which is reinforced by laterally extending knife or interlocking members which are secured to the plates, whereby the tire will bite the roadbed both in a longitudinal and transverse direction, to insure a firm grip thereon, and to prevent a movement of the wheels in a lateral direction.

A still further object of the invention is the construction of an armor for pneumatic tires made up of a plurality of plates shaped to conform to the portion of the tire with which they engage and which have no projections or extensions that can inflict injury to the tire, each of the said plates having a flexible connection, and being provided to their opposite sides with extending members which will limit the sinking of the tire in sandy ground, each of the said plates having one of its ends formed with a gripping flange, and which is centrally provided with an additional flange which tapers from its end to its point of engagement with the lip or flange, whereby the said plate will be insured a firm grip with the surface over which the vehicle travels.

With the above and other objects in view, the improvement resides in the construction, combination and arrangement of parts set forth in the following specification and falling within the scope of the appended claim.

Figure 7:
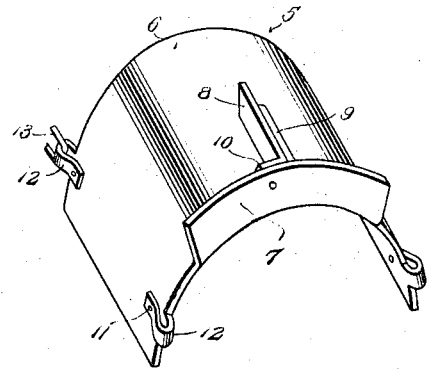
Figure 8:
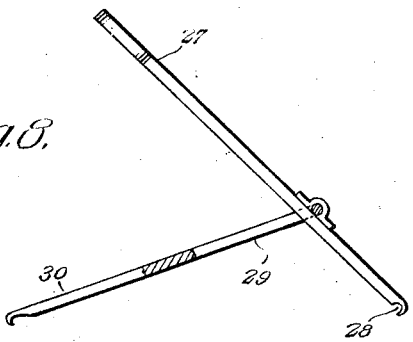
Figure 9:
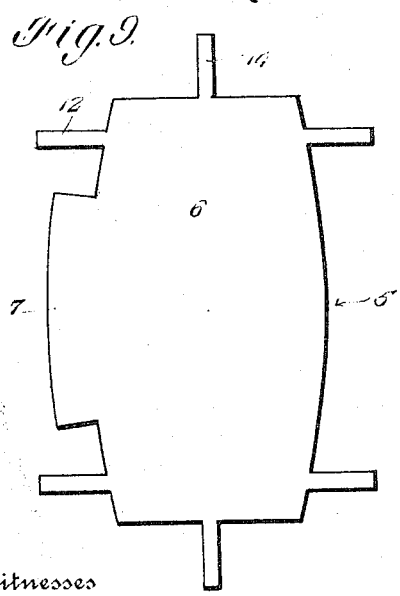
Figure 10:
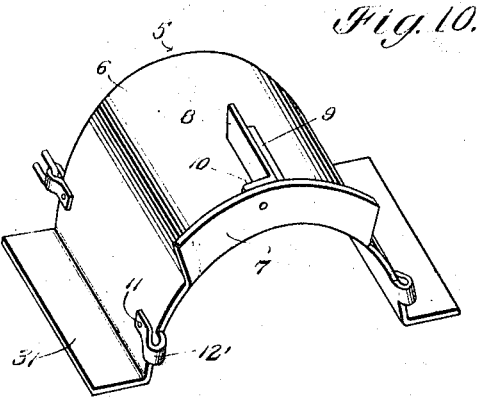

In the drawings: Figure 1 is a side elevation of a wheel provided with my improved tire armor, Fig. 2 is a front elevation of the same, Fig. 3 is a detail perspective view illustrating the manner of connecting the end members or plates, Fig. 4 is a longitudinal section on the line $u$—$u$ of Fig. 2, Fig. 5 is a transverse sectional view on the line $v$—$v$ of Fig. 1, Fig. 6 is a longitudinal section on the line $w$—$w$ of Fig. 2, Fig. 7 is a detail perspective view of one of the armor sections or plates, Fig. 8 is an elevation, partly in section, of a device which may be employed for drawing the end links of the armor toward each other to permit of a connection between the same, Fig. 9 is a plan of the blank from which one of the armor sections is formed, and Fig. 10 is a perspective view of a modified form of one of the sections.

In the drawings like reference characters designate corresponding parts throughout the several views.

The numeral 1 designates an ordinary wheel for automobiles or the like, and which has its rim 2 provided with a pneumatic tire 3.

The numeral 4 designates broadly the improved tire armor which is made up of a plurality of sections 5 that are flexibly connected together as will hereinafter be more fully set forth. Each of the sections 5 is of a similar construction, each being formed from a sheet of suitable material, metal preferred, and each having its body 6 rounded or curved from its opposite end to conform with the shape of the portion of the tire 3 with which it is to engage. The body 6 is not only rounded from its opposite ends, but is dished from its opposite edges, and one of the said edges is provided with an extending portion which is bent at a right angle to the body to form a lip 7, the lip being rounded to conform to the shape of the body, but terminating on the sides thereof at a suitable distance from its opposite ends. The lip 7 is not necessarily provided by bending an extending portion of the metal from which the section is formed, as the sections may be molded or cast, and the lip molded or cast with the sections. In the showing of the drawings I have illustrated an entering member in the nature of a plate 8 which is angular in cross section, one of the angular portions being secured, as at 9, to each of the sections 5, the second angular portion which forms the entering member proper having its end bent at a right angle and secured, as at 10, to the lip 7. It is, of course, to be understood that the member 8 may be integrally formed with the section if desired, and each of the said sections have their longitudinal edges above the terminal of the lip 7 formed with laterally extending members which are adapted to have their ends bent over the body proper and secured thereto, as at 11, thus providing the said body adjacent its opposite ends with spaced eyes 12 which project over the longitudinal edges of the said body and which are adapted to receive links 13, whereby the sections of the armor may be flexibly secured together. Certain of the sections 5 have their ends formed with straps which are bent outwardly and downwardly over the bodies to provide spring clips or hooks 14, and each of said hooks is adapted to receive a link 15, one of the said links having arranged thereon a strap 16 which is provided with a suitable buckle 17, and the said strap is adapted to be passed over the tire 3 between the spokes of the wheel through the second link of the section 5, and is returned over the rim to engage with the tongue of the buckle 17. One of the leads of the strap is preferably arranged to one side of the spoke of the wheel, and the second lead preferably arranged to the opposite side of the said spoke, and with such an arrangement it will be noted that danger of the armor sections slipping or sliding along the tire will be effectively prevented. Furthermore, the sections of the tire are so arranged as to fully engage the entire surface of the tire so that it will tightly contact therewith, but not with sufficient friction to injure the tire. It is also to be understood that a cushion member, c, in the nature of cloth, canvas, rubber or the like may be, and preferably is, interposed between the armor and the outer face of the tire.

One of the end sections of the armor is distinguished from the remainder by the character 18, this section being of a similar construction to the sections previously described, the second end section being distinguished from the remainder by the character 19, and this section is also substantially similar to those previously described. The section 19, however, has what I will term its outer edge formed with hooks 20 in lieu of the eyes 12, and the said hooks are disposed diametrically opposite the eyes 12 upon the opposite side of the sections. Pivotally secured to the section 19, as at 21, are the body members 22 of spring catch members 23. These members 23 have their ends rounded outwardly, as at 24, and are adapted to be swung over the open ends of the hooks, after the links 13 connected with the eyes in the members 18 have been engaged by the said hooks.

The body members of the catch 23 directly to the rear of their rounded engaging portions 24 are formed with lateral extensions 25 and 26 respectively which are adapted to contact with the links 13 engaged by the hooks and also provide a roller bearing upon the outer face of the section 19 and whereby the links are prevented from becoming accidentally removed from the hooks. In order to bring the end members fully together to permit of the links of the end member 22 being engaged by the hooks 20 and catches 23 of the end member 19, I provide a tool which includes a handle 27 having one of its ends formed with a rounded depression 28. The member 27 is of a width substantially equaling the distance between the longitudinal members of the links 13, and pivotally secured to the handle, above the depression 28, is the slotted or bifurcated end 29 of a hook member 30. The hook has its end formed with a rounded lip, similar to the lip provided by the depression 28 in the handle 27 and the lip is of a width less than the distance between the longitudinal members of the links. By arranging the lip of the handle between the links of one of the end members, to bring the same into engagement with the eye which connects the said link with the said end member, and by swinging the hook into engagement with one of the links carried by the member 19, it will be noted that a pull upon the handle or lever will draw the said end link to permit of the same being arranged within the hook 20 and engaged by the catch 23. The tool is operated in a similar manner for bringing the second link member into engagement with the second hook.

In Fig. 9 of the drawings I have illustrated a section of an armor similar to that above described, except that the said member, preferably below the eyes 12' thereof, is formed with outwardly extending flanges 31, the said flanges being disposed at a right angle to the rim of the wheel and extending the entire width of the armor section, and projecting therefrom a suitable distance and adapted to serve as means for preventing the armor sinking in sandy ground as will readily be understood.

In all of the figures of the drawings, the members 8 are rounded from their points of connection with the body of the armor sections to the lips 7, the rounded portions being the first to enter the roadbed gradually making way for the lips, but, of course, the tire sections may be applied to the tire so that the lips thereof may first enter the roadbed, and the strain thereon be resisted by the said members 8.

Having thus described the invention, what I claim is:

An armor for pneumatic tires including a plurality of members shaped to agree with the portion of the tire with which they engage, a flexible connection between all of the sections, each of the sections having one of its edges downturned to provide a lip, an entering member secured centrally upon the outer face of each of the sections and arranged at an angle to the lip and secured with the lip, means for connecting the end sections, and means for securing the armor upon the tire.

In testimony whereof I affix my signature in presence of two witnesses.

JOHN CLATT.

Witnesses:
 ALPHA PALMER,
 JOHN W. THOMAS.